United States Patent
Komuro et al.

(10) Patent No.: US 11,814,041 B2
(45) Date of Patent: Nov. 14, 2023

(54) VEHICLE CONTROL DEVICE, VEHICLE CONTROL METHOD, AND STORAGE MEDIUM THAT PERFORMS RISK CALCULATION FOR TRAFFIC PARTICIPANT

(71) Applicant: HONDA MOTOR CO., LTD., Tokyo (JP)

(72) Inventors: Misa Komuro, Wako (JP); Yosuke Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 17/070,969

(22) Filed: Oct. 15, 2020

(65) Prior Publication Data

US 2021/0114589 A1  Apr. 22, 2021

(30) Foreign Application Priority Data

Oct. 18, 2019 (JP) .................................. 2019-191024

(51) Int. Cl.
   *B60W 30/09* (2012.01)
   *G08G 1/16* (2006.01)
   (Continued)

(52) U.S. Cl.
   CPC ............ *B60W 30/09* (2013.01); *B60R 11/04* (2013.01); *B60W 10/04* (2013.01); *B60W 10/18* (2013.01);
   (Continued)

(58) Field of Classification Search
   CPC ...... B60W 30/09; B60W 10/04; B60W 10/18; B60W 10/20; B60W 2420/42;
   (Continued)

(56) References Cited

U.S. PATENT DOCUMENTS

2014/0354684 A1* 12/2014 Beckwith ................ G06F 3/011
                                                          345/633
2015/0091740 A1*  4/2015 Bai ........................ B60K 35/00
                                                          340/901

(Continued)

FOREIGN PATENT DOCUMENTS

CN   107921923   4/2018
CN   108725454   11/2018
(Continued)

OTHER PUBLICATIONS

Japanese Office Action for Japanese Patent Application No. 2019-191024 dated Dec. 6, 2022.
Chinese Office Action for Chinese Patent Application No. 202011093543.4 dated Aug. 15, 2023.

*Primary Examiner* — Jason Holloway
(74) *Attorney, Agent, or Firm* — AMIN, TUROCY & WATSON, LLP

(57) ABSTRACT

A vehicle control device includes a peripheral recognition unit configured to recognize a peripheral status of a vehicle including a position of a traffic participant present in a periphery of the vehicle on the basis of an output of an in-vehicle device, an estimation unit configured to estimate a peripheral attention ability of the traffic participant on the basis of an output of the in-vehicle device, and a risk area setting unit configured to set a risk area of the traffic participant on the basis of a result of the estimation performed by the estimation unit.

9 Claims, 10 Drawing Sheets

(51) Int. Cl.
*B60R 11/04* (2006.01)
*B60W 10/04* (2006.01)
*B60W 10/20* (2006.01)
*B60W 10/18* (2012.01)
*B60R 11/00* (2006.01)

(52) U.S. Cl.
CPC ............ *B60W 10/20* (2013.01); *G08G 1/163* (2013.01); *B60R 2011/0003* (2013.01); *B60W 2420/42* (2013.01); *B60W 2554/4047* (2020.02); *B60W 2554/4048* (2020.02); *B60W 2710/18* (2013.01); *B60W 2710/20* (2013.01); *B60W 2720/10* (2013.01); *B60W 2720/12* (2013.01)

(58) Field of Classification Search
CPC . B60W 2554/4047; B60W 2554/4048; B60W 2710/18; B60W 2710/20; B60W 2720/10; B60W 2720/12; B60W 2552/45; B60W 2554/4029; B60W 60/0017; B60R 11/04; B60R 2011/0003; G08G 1/163; G08G 1/166
See application file for complete search history.

(56) References Cited

U.S. PATENT DOCUMENTS

| | | | |
|---|---|---|---|
| 2016/0300485 A1* | 10/2016 | Ayvaci | G08G 1/166 |
| 2017/0057497 A1 | 3/2017 | Laur et al. | |
| 2019/0278270 A1 | 9/2019 | Tsuchiya et al. | |
| 2020/0079371 A1* | 3/2020 | Sakamoto | G06V 40/20 |
| 2020/0380273 A1* | 12/2020 | Saez | G06K 9/6278 |
| 2021/0158700 A1 | 5/2021 | Mao | |

FOREIGN PATENT DOCUMENTS

| | | |
|---|---|---|
| CN | 109263659 | 1/2019 |
| CN | 110239549 | 9/2019 |
| JP | 2006-163637 | 6/2006 |
| JP | 2007-210403 | 8/2007 |
| JP | 2008-204004 | 9/2008 |
| JP | 2013-173416 | 9/2013 |
| JP | 2015-032312 | 2/2015 |
| JP | 2017-010560 | 1/2017 |
| JP | 2019-059248 | 4/2019 |
| JP | 2019-114104 | 7/2019 |
| JP | 2019-156008 | 9/2019 |

* cited by examiner

VEHICLE CONTROL DEVICE, VEHICLE CONTROL METHOD, AND STORAGE MEDIUM THAT PERFORMS RISK CALCULATION FOR TRAFFIC PARTICIPANT

CROSS-REFERENCE TO RELATED APPLICATION

Priority is claimed on Japanese Patent Application No. 2019-191024, filed Oct. 18, 2019, the content of which is incorporated herein by reference.

BACKGROUND OF THE INVENTION

Field of the Invention

The present invention relates to a vehicle control device, a vehicle control method, and a storage medium.

Description of Related Art

Research and practical application of automated driving of a vehicle (hereinafter referred to as automated driving) are in progress. In automated driving, it is required to automatically generate a target trajectory according to a status of a traveling direction.

In this regard, a technology for calculating a risk area (a risk degree) for a traffic participant on the basis of an attribute of the traffic participant (a risk element) in the traveling direction of a vehicle and a distance between the risk element and the vehicle is disclosed (for example, refer to Japanese Unexamined Patent Application, First Publication No. 2007-210403).

SUMMARY OF THE INVENTION

However, in addition to an attribute of a traffic participant, estimating a peripheral attention ability of a traffic participant and calculating a risk for the traffic participant has not been disclosed.

Aspects according to the present invention have been made in view of such circumstances, and an object thereof is to provide a vehicle control device, a vehicle control method, and a storage medium that can enhance the validity of a risk calculation for a traffic participant.

The present invention has adopted the following aspects to solve the problems described above and achieve the object.

(1): A vehicle control device according to one aspect of the present invention includes a peripheral recognition unit configured to recognize a peripheral status of a vehicle including a position of a traffic participant present in a periphery of the vehicle on the basis of an output of an in-vehicle device, an estimation unit configured to estimate a peripheral attention ability of the traffic participant on the basis of the output of the in-vehicle device, and a risk area setting unit configured to set a risk area of the traffic participant on the basis of a result of the estimation performed by the estimation unit.

(2): In the aspect of (1) described above, when it is estimated by the estimation unit that the peripheral attention ability of the traffic participant is reduced, the risk area setting unit may set a risk area of the traffic participant to be larger than when it is not estimated by the estimation unit that the peripheral attention ability of the traffic participant is reduced.

(3): In the aspect of (2) described above, the estimation unit may determine whether a person who is the traffic participant is gazing at a mobile terminal, and estimate that the peripheral attention ability of the traffic participant is reduced when the traffic participant is gazing at a mobile terminal.

(4): In the aspect of (2) or (3) described above, the estimation unit may determine whether a person who is the traffic participant is in a drunken state, and estimate that the peripheral attention ability of the traffic participant is reduced when the traffic participant is in a drunken state.

(5): In the aspect of any one of (2) to (4) described above, the estimation unit may determine whether the ears of a person who is the traffic participant are blocked, and estimate that the peripheral attention ability of the traffic participant is reduced when the ears of the traffic participant are blocked.

(6): In the aspect of any one of (2) to (5) described above, the estimation unit may determine whether a field of view of a person who is the traffic participant is blocked, and estimate that the peripheral attention ability of the traffic participant is reduced when the field of view of the traffic participant is blocked.

(7): A vehicle control method according to another aspect of the present invention includes, by a computer, recognizing a peripheral status of a vehicle including a position of a traffic participant present in a periphery of the vehicle on the basis of an output of an in-vehicle device, estimating a peripheral attention ability of the traffic participant on the basis of the output of the in-vehicle device, and setting a risk area of the traffic participant on the basis of a result of estimation.

(8): A computer readable non-transitory storage medium according to still another aspect of the present invention stores a program that causes a computer to execute recognizing a peripheral status of a vehicle including a position of a traffic participant present in a periphery of the vehicle on the basis of an output of an in-vehicle device, estimating a peripheral attention ability of the traffic participant on the basis of the output of the in-vehicle device, and setting a risk area of the traffic participant on the basis of a result of estimation.

According to the aspects of (1) to (8) described above, it is possible to enhance the validity of a risk calculation for the traffic participant.

DETAILED DESCRIPTION OF THE INVENTION

Hereinafter, an embodiment of a vehicle control device, a vehicle control method, and a program of the present invention will be described with reference to the drawings. The vehicle control device of the embodiment is applied to an automated driving vehicle. Automated driving is, for example, to execute driving control by controlling both steering and acceleration or deceleration of a vehicle. The vehicle control device of the embodiment may also be applied to a vehicle that supports driving assistance such as an adaptive cruise control system (ACC) or a lane keeping assistance system (LKAS).

[Overall Configuration]

Figure 1:
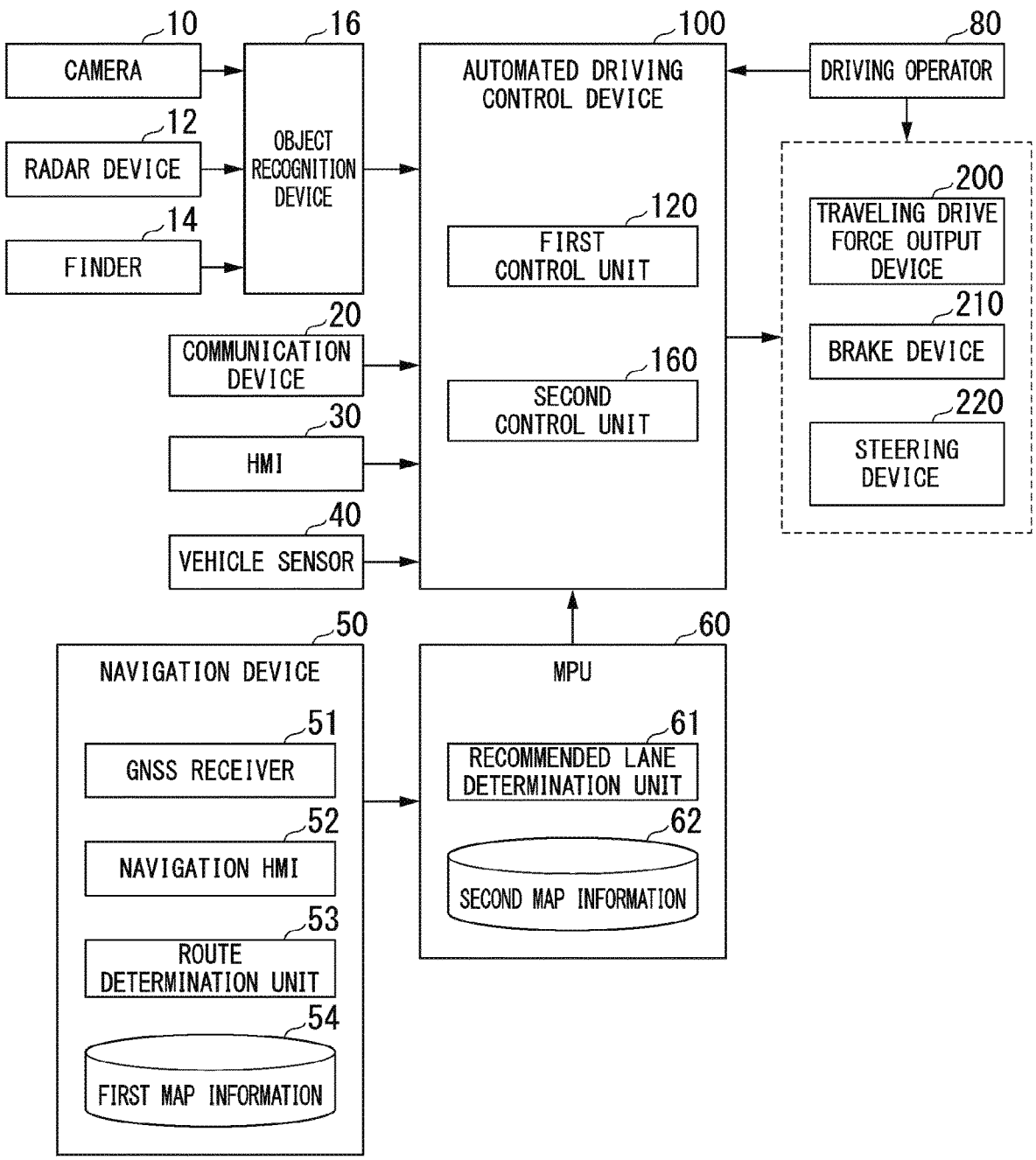
FIG. 1 is a configuration diagram of a vehicle system.

FIG. 1 is a configuration diagram of a vehicle system 1 using an automated driving control device 100 of the embodiment. The automated driving control device 100 is an example of a "vehicle control device." A vehicle in which the vehicle system 1 is mounted is, for example, a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generation unit connected to the internal combustion engine or electric power discharged from a secondary battery or a fuel cell.

The vehicle system 1 includes, for example, a camera 10, a radar device 12, a finder 14, an object recognition device 16, a driving operator 80, an automated driving control device 100, a traveling drive force output device 200, a brake device 210, and a steering device 220. These devices or apparatuses are connected to each other by a multiplex communication line such as a controller area network (CAN) communicator line, a serial communication line, a wireless communication network, or the like. The configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to an arbitrary position of a vehicle (hereinafter, a host vehicle M) in which the vehicle system 1 is mounted. When the front is imaged, the camera 10 is attached to an upper part of the front windshield, a back of the rearview mirror, or the like. The camera 10 periodically repeats to image a periphery of the host vehicle M. The camera 10 may also be a stereo camera.

The radar device 12 radiates radio waves such as millimeter waves to the periphery of the host vehicle M, and detects at least a position (a distance and an orientation) of an object by detecting radio waves (reflected waves) reflected by the object. The radar device 12 is attached to an arbitrary part of the host vehicle M. The radar device 12 may detect the position and a speed of the object using a frequency modulated continuous wave (FM-CW) method.

The finder 14 is a light detection and ranging (LIDAR). The finder 14 radiates light (electromagnetic waves with wavelengths close to that of light) to the periphery of the host vehicle M and measures scattered light. The finder 14 detects a distance to a target on the basis of time from light emission and light reception. The radiated light is, for example, pulsed laser light. The finder 14 is attached to an arbitrary part of the host vehicle M.

The object recognition device 16 performs sensor fusion processing on a result of detection performed by some or all of the camera 10, the radar device 12, and the finder 14, and recognizes the position, type, speed, and the like of the object. The object recognition device 16 outputs a result of the recognition to the automated driving control device 100. The object recognition device 16 may output results of detections by the camera 10, the radar device 12, and the finder 14 to the automated driving control device 100 as they are. The object recognition device 16 may be omitted from the vehicle system 1.

The communication device 20 uses, for example, a cellular network, a Wi-Fi network, a Bluetooth (a registered trademark), a dedicated short range communication (DSRC), or the like, and communicates with other vehicle present in the periphery of an automated driving vehicle or communicates with various types of server devices via wireless base stations. The communication device 20 is an example of a "communication unit."

The HMI 30 presents various types of information to an occupant of the automated driving vehicle and receives an input operation from the occupant. The HMI 30 includes various display devices, speakers, buzzers, touch panels, switches, keys, and the like.

The vehicle sensor 40 includes a vehicle speed sensor that detects the speed of the automated driving vehicle, an acceleration sensor that detects the acceleration, a yaw rate sensor that detects an angular speed around a vertical axis, an orientation sensor that detects a direction of the automated driving vehicle, and the like.

The navigation device 50 includes, for example, a GNSS receiver 51, a navigation HMI 52, and a route determination unit 53. The navigation device 50 holds first map information 54 in a storage device such as an HDD or a flash memory. The GNSS receiver 51 identifies the position of the automated driving vehicle on the basis of a signal received from a GNSS satellite. The position of the automated driving vehicle may be identified or supplemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determination unit 53 determines, for example, a route (hereinafter, a route on a map) from the position (or an arbitrary input position) of the automated driving vehicle identified by the GNSS receiver 51 to a destination input from the occupant using the navigation HMI 52 with reference to the first map information 54. The first map information 54 is, for example, information in which a road shape is expressed by a link indicating a road and a node connected by the link. The first map information 54 may include curvature of a road, point of interest (POI) information, and the like. The route on a map is output to the MPU 60. The navigation device 50 may perform route guidance using the navigation HMI 52 on the basis of the route on a map. The navigation device 50 may be realized by, for example, a function of a terminal device such as a smart phone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determination unit 61, and holds second map information 62 in the storage device such as an HDD or a flash memory. The recommended lane determination unit 61 divides the route on a map provided from the navigation device 50 into a plurality of blocks (for example, divides every 100 [m] in a vehicle traveling direction), and determines a recommended lane for each block with reference to the second map information 62. The recommended lane determination unit 61 determines which numbered lane to travel from the left. When there is a branch point in the route on a map, the recommended lane determination unit 61 determines a recommended lane such that the automated driving vehicle travels in a reasonable route for traveling to a branch destination.

The second map information 62 is map information with higher accuracy than the first map information 54. The second map information 62 includes, for example, information on a center of a lane, information on a boundary of the lane, or the like. The second map information 62 may include road information, traffic regulation information, address information (addresses/postal codes), facility information, telephone number information, and the like. The second map information 62 may be updated at any time by the communication device 20 communicating with another device.

The driving operator 80 includes, for example, an accelerator pedal, a brake pedal, a shift lever, a steering wheel, a modified steer, a joystick, and other operators. A sensor that detects an operation amount or a presence or absence of an operation is attached to the driving operator 80, and this detection result is output to the automated driving control device 100 or some or all of the traveling drive force output device 200, the brake device 210, and the steering device 220.

The automated driving control device 100 includes, for example, a first control unit 120 and a second control unit 160. Each of the first control unit 120 and the second control unit 160 is realized by, for example, a hardware processor such as a CPU executing a program (software). Some or all of these components may be realized by hardware (a circuit; including circuitry) such as an LSI, an ASIC, an FPGA, or a GPU and may also be realized by a cooperation of software and hardware. The program may be stored in advance in a storage device (a storage device including a non-transitory storage medium) such as an HDD or a flash memory of the automated driving control device 100, or may be stored in a detachable storage medium such as a DVD or a CD-ROM and installed in the HDD or flash memory of the automated driving control device 100 by the storage medium (the non-transitory storage medium) being mounted on a drive device.

Figure 2:
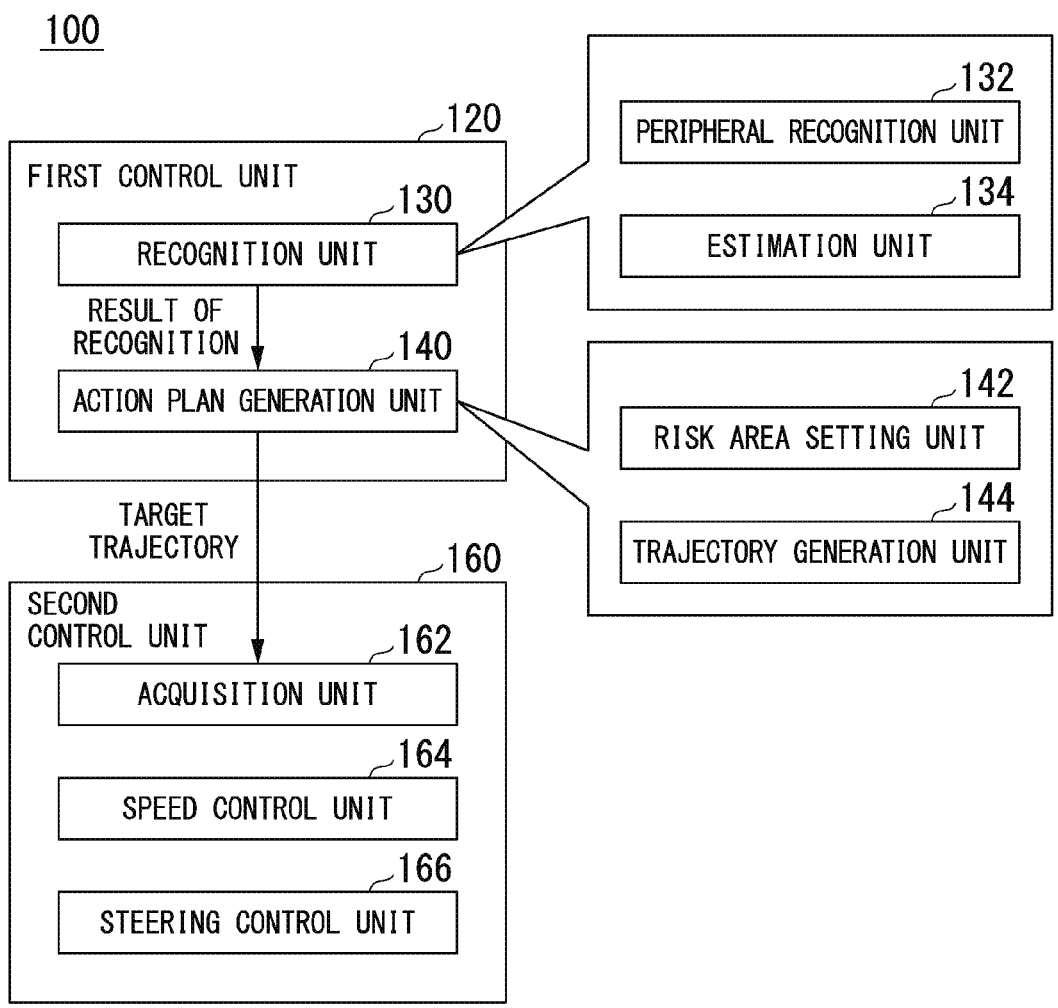
FIG. 2 is a functional configuration diagram of a first control unit and a second control unit.

FIG. 2 is a functional configuration diagram of the first control unit 120 and the second control unit 160. The first control unit 120 includes, for example, a recognition unit 130 and an action plan generation unit 140. The first control unit 120 realizes, for example, a function based on artificial intelligence (AI) and a function based on a model given in advance in parallel. For example, a function of "recognizing an intersection" may be realized by executing a recognition of an intersection by deep learning or the like and a recognition based on conditions (including pattern matching signals, road markings, and the like) given in advance in parallel and comprehensively evaluating the both by scoring them. As a result, a reliability of automated driving is guaranteed.

The recognition unit 130 recognizes the periphery of the host vehicle M and estimates a behavior of a recognized target. The recognition unit 130 includes, for example, a peripheral recognition unit 132 and an estimation unit 134.

The peripheral recognition unit 132 recognizes states such as a position, a speed, and an acceleration of an object (for example, a vehicle in front, an oncoming vehicle, or a traffic participant such as a pedestrian or a bicycle) in the periphery of an automated driving vehicle on the basis of information to be input from the camera 10, the radar device 12, and the finder 14 via the object recognition device 16. The position of the object is, for example, recognized as a position on absolute coordinates having the origin at a representative point (a center of gravity, a center of a drive axis, or the like) of the automated driving vehicle, and is used for control. The position of the object may be represented by a representative point such as a center of gravity or a corner of the object, or may be represented by an expressed area. A "state" of the object may include the acceleration or jerk of the object, or an "action state" (for example, whether a preceding vehicle of the host vehicle M is changing lanes or is about to change lanes).

The peripheral recognition unit 132 recognizes a position and a posture of an automated driving vehicle with respect to a traveling lane when the traveling lane is recognized. The peripheral recognition unit 132 may recognize a deviation from a center of a lane of a reference point of the automated driving vehicle and an angle formed with respect to a line connecting centers of a lane in a traveling direction of the automated driving vehicle as a relative position and a relative posture of the automated driving vehicle with respect to the traveling lane. Instead, the peripheral recognition unit 132 may also recognize a position or the like of the reference point of the automated driving vehicle with respect to one of side ends (a road marking line or road boundary) of the traveling lane as a relative position of the automated driving vehicle with respect to the traveling lane.

The peripheral recognition unit 132 recognizes, for example, a lane (a traveling lane) in which the automated driving vehicle is traveling. For example, the peripheral recognition unit 132 recognizes a traveling lane by comparing a pattern (for example, an array of solid lines and broken lines) of road marking lines obtained from the second map information 62 with a pattern of road marking lines in a periphery of the automated driving vehicle recognized from an image captured by the camera 10. The peripheral recognition unit 132 may recognize the traveling lane by recognizing not only the road marking lines but also traveling road boundaries (road boundaries) including road marking lines and shoulders, curbs, medians, guardrails, gutters, and the like. In this recognition, the position of the automated driving vehicle acquired from the navigation device 50 and a result of processing performed by an INS may be taken into consideration. The peripheral recognition unit 132 recognizes a temporary stop line, a traffic light, and other road events.

The peripheral recognition unit 132 recognizes information on a road on which a vehicle in the periphery, particularly, the host vehicle M, is scheduled to travel on the basis of the vehicle in the periphery of the host vehicle M recognized from the image captured by the camera 10 and positional information obtained from the image captured by the camera 10, traffic congestion information of the periphery of the host vehicle M acquired by the navigation device 50, or the second map information 62. The information on a road on which traveling is scheduled includes, for example, a width of a lane (a road width) in which the host vehicle M is scheduled to travel.

The estimation unit 134 estimates the attributes of the traffic participants positioned in the periphery of the host vehicle M and the peripheral attention ability of the traffic participants, recognized by the peripheral recognition unit 132. The attributes of the traffic participants include, for example, ages and sexes of the traffic participants, whether a walking aid such as a crutch is used, and the like. The estimation unit 134 may receive the information input from the camera 10, the radar device 12, and the finder 14 via the object recognition device 16 without going through the peripheral recognition unit 132, and estimate the attributes of the traffic participants and the peripheral attention ability of the traffic participants on the basis of these types of information. The peripheral attention ability of the traffic participants will be described below.

The action plan generation unit 140 travels, in principle, a recommended lane determined by the recommended lane determination unit 61, and further generates a target trajectory for future travel of the host vehicle M such that automated driving corresponding to a peripheral status of the host vehicle M is executed. The target trajectory includes, for example, a speed element. For example the target trajectory is expressed as a sequential arrangement of points (trajectory points) to be reached by the host vehicle M. The trajectory points are points to be reached by the host vehicle M for each predetermined traveling distance (for example, about several [m]) in a distance along a road, and, apart from this, a target speed and a target acceleration for each predetermined sampling time (for example, about several decimal numbers [sec]) are generated as a part of the target trajectory.

The action plan generation unit 140 may set an event of automated driving in generating a target trajectory. The event of automated driving includes a constant speed driving event, a low sped following driving event, a lane change event, a branching event, a contact avoidance event, a merging event, and the like. The action plan generation unit 140 generates a target trajectory in accordance with an activated event.

The action plan generation unit 140 includes, for example, a risk area setting unit 142 and a trajectory generation unit 144.

The risk area setting unit 142 sets a risk area RA on the basis of a result of the estimation of the attributes and the peripheral attention ability of the traffic participants performed by the estimation unit 134. The risk area RA will be described below.

The trajectory generation unit 144 generates a traveling trajectory including a speed component of the host vehicle M on the basis of the risk area RA set by the risk area setting unit 142. The trajectory generation unit 144 generates, for example, a traveling trajectory of the host vehicle M so as to avoid approaching or contacting the risk area RA.

The second control unit 160 controls the traveling drive force output device 200, the brake device 210, and the steering device 220 such that the automated driving vehicle passes through the target trajectory generated by the target trajectory generation unit 140 at a scheduled time. A combination of functions of the trajectory generation unit 144 and the second control unit 160 is an example of a "control unit."

The second control unit 160 includes, for example, an acquirer 162, a speed control unit 164, and a steering control unit 166. The acquirer 162 acquires information on the target trajectory (trajectory points) generated by the action plan generation unit 140, and stores it in a memory (not shown). The speed control unit 164 controls the traveling drive force output device 200 or the brake device 210 on the basis of a speed element associated with the target trajectory stored in the memory. The steering control unit 166 controls the steering device 220 in accordance with a bending degree of the target trajectory stored in the memory. Processing of the speed control unit 164 and the steering control unit 166 is realized by, for example, a combination of feed forward control and feedback control. As an example, the steering control unit 166 executes a combination of the feed forward control in accordance with curvature of a road in front of the automated driving vehicle and the feedback control based on a deviation from the target trajectory Returning to FIG. 1, the traveling drive force output device 200 outputs a traveling drive force (torque) for a traveling of a vehicle to drive wheels. The traveling drive force output device 200 includes, for example, a combination of an internal combustion engine, an electric motor, a transmission, and the like, and an ECU that controls these. The ECU controls the constituents described above according to information input from the second control unit 160 or information input from the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor according to the information input from the second control unit 160 or the information input from the driving operator 80 such that a brake torque corresponding to a braking operation is output to each wheel. The brake device 210 may include, as a backup, a mechanism that transmits the hydraulic pressure generated by an operation of the brake pedal included in the driving operator 80 to the cylinder via a master cylinder. The brake device 210 is not limited to the configuration described above, and may be an electronically controlled hydraulic brake device that controls an actuator according to the information input from the second control unit 160 and transmits the hydraulic pressure of the master cylinder to the cylinder.

The steering device 220 includes, for example, a steering ECU and an electric motor. The electric motor changes a direction of a steering wheel by applying a force to, for example, a rack and pinion mechanism. The steering ECU drives an electric motor according to the information input from the second control unit 160 or the information input from the driving operator 80, and changes the direction of the steering wheel.

[Estimation of Pedestrian]

Figure 3:
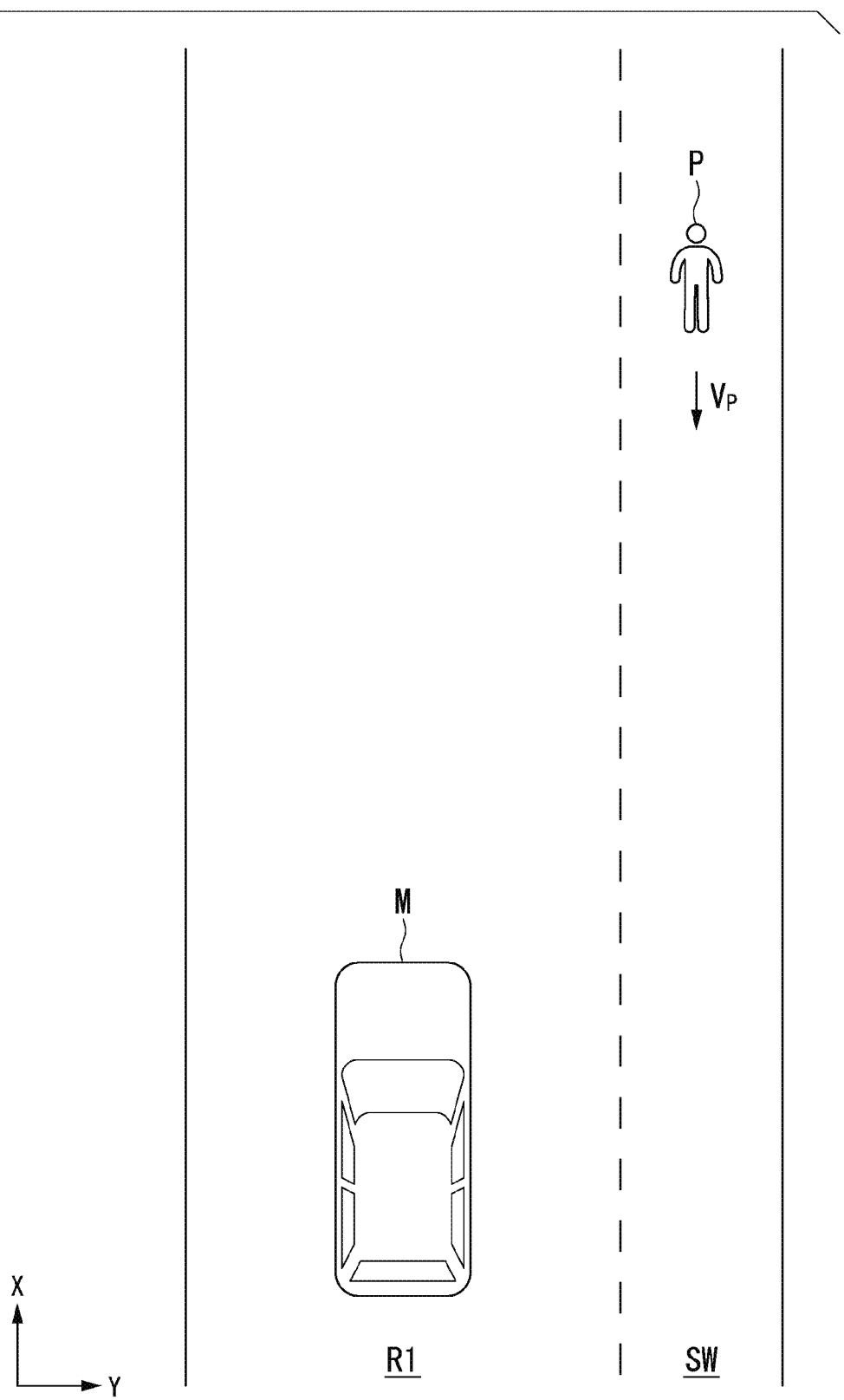
FIG. 3 is a diagram which describes processing performed by a peripheral recognition unit.

FIG. 3 is a diagram which describes processing performed by the peripheral recognition unit 132. The peripheral recognition unit 132 recognizes a road R1 on which the host vehicle M is traveling and a sidewalk SW adjacent to the road R1. The peripheral recognition unit 132 recognizes a traffic participant P who is moving along the sidewalk SW at a speed VP in a direction opposite to an X-axis direction in FIG. 3.

The estimation unit 134 estimates the attribute of the traffic participant P positioned in the periphery of the host vehicle M and the peripheral attention ability of the traffic participant P recognized by the peripheral recognition unit 132.

Figure 4:
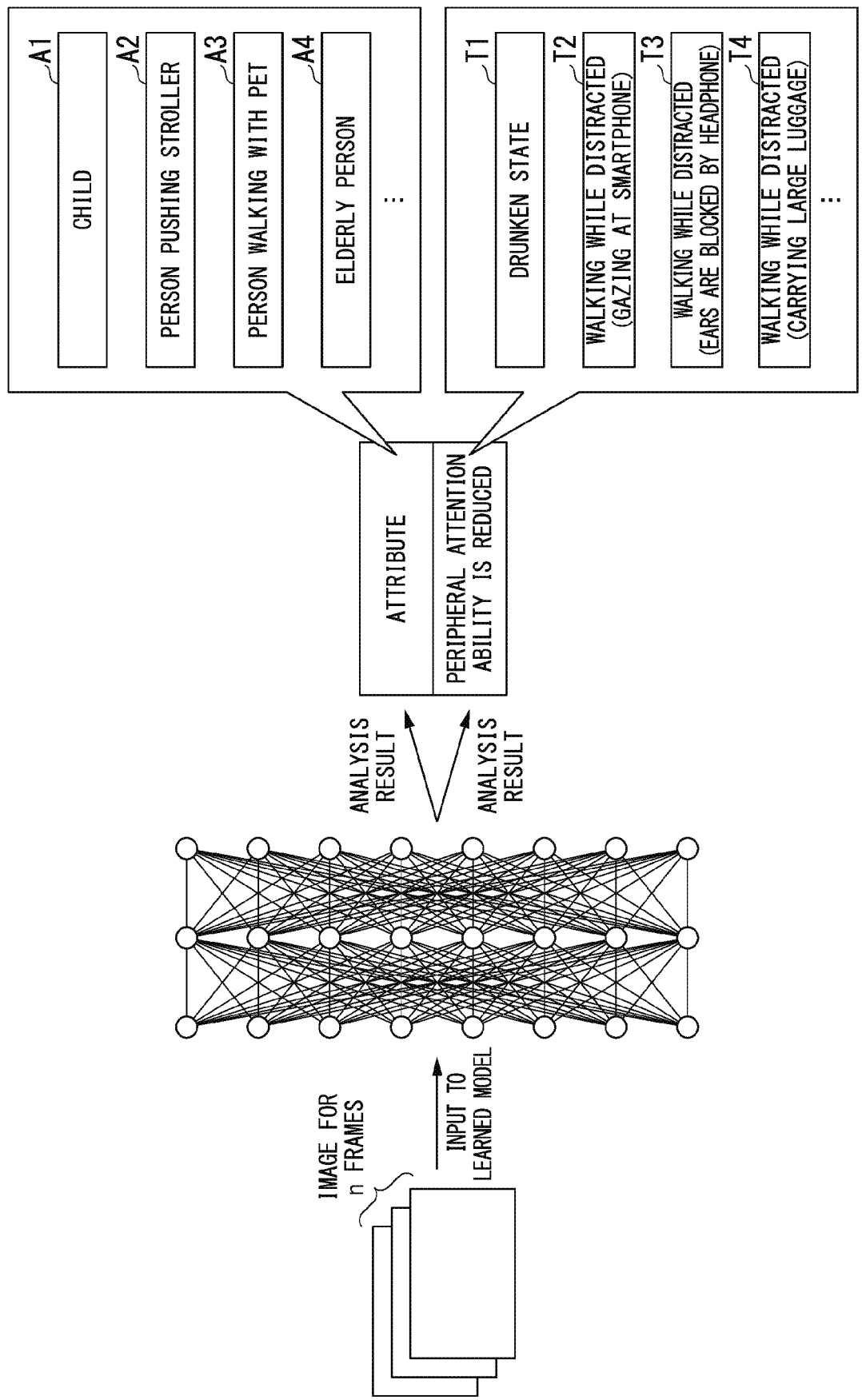
FIG. 4 is a diagram which describes estimation processing performed by an estimation unit.

FIG. 4 is a diagram which describes estimation processing performed by the estimation unit 134. The estimation unit 134 recognizes, for example, the attribute of the traffic participant on the basis of a result of recognition (a still image or a moving image) for one to several frames performed by the peripheral recognition unit 132. Furthermore, the estimation unit 134 estimates the peripheral attention ability of the traffic participant P by estimating a status of the traffic participant P, and a movement tendency or a gesture of the traffic participant P on the basis of the result of the recognition (the still image or the moving image) for one to several frames among the results of recognition from the peripheral recognition unit 132.

The peripheral attention ability is an ability of the traffic participant P to take an appropriate action with the approach of an object in the periphery and refrain from sudden actions that affect the object in the periphery. For example, the estimation unit 134 estimates that the peripheral attention ability is high when the traffic participant P can cope with an unexpected situation without delay. The estimation unit 134 estimates that the peripheral attention ability is low when the traffic participant P is likely to be slow coping with an unexpected situation.

The estimation unit 134 estimates the peripheral attention ability of the traffic participant P using a learned model of some patterns in which the peripheral attention ability can be estimated directly or indirectly. The learned model is, for example, a calculation model that outputs at least one of a result of determining whether the traffic participant P has the predetermined attributes and a result of determining whether the traffic participant P is in a state of the predetermined types if an image captured by the camera 10 is input.

The estimation unit 134 determines whether a result of calculation using the learned model falls within predetermined attributes A1 to Am (m is a natural number) in which the peripheral attention ability of the traffic participant P is estimated to be low. The predetermined attributes include, for example, a child, a person pushing a stroller, a person walking with a pet, an elderly person, and the like.

The estimation unit 134 determines whether the result of calculation using the learned model falls within predetermined types T1 to Tl (l is a natural number) in which the peripheral attention ability of the traffic participant P is estimated to be reduced. The predetermined types include a drunken state, a state of walking while distracted, and the like.

For example, the estimation unit 134 estimates that the peripheral attention ability is low when it is estimated that the traffic participant P is in a drunken state. The estimation unit 134 may estimate that the peripheral attention ability is low in the same manner as when it is estimated that the traffic participant P is in the drunken state when the traffic participant P is in a state of unconsciousness due to poor physical condition or the like.

The estimation unit 134 estimates that the peripheral attention ability is low when the traffic participant P is classified as in a state of walking while distracted. Walking while distracted includes, for example, a state of gazing at a mobile terminal (a smartphone, a portable game console, or the like), a state of ears being blocked by headphones, a state of carrying large luggage such as a climbing backpack that narrows a field of view (partially blocks a field of view), a state of being engrossed in conversation with another traffic participant, and the like. A target at which the traffic participant P gazes may not be a mobile terminal, and may also be, for example, reading material such as a book or a map, or property such as a food item or a paper cup that can be held in the palm of the hand.

[Setting of Risk Area]

Figure 5:
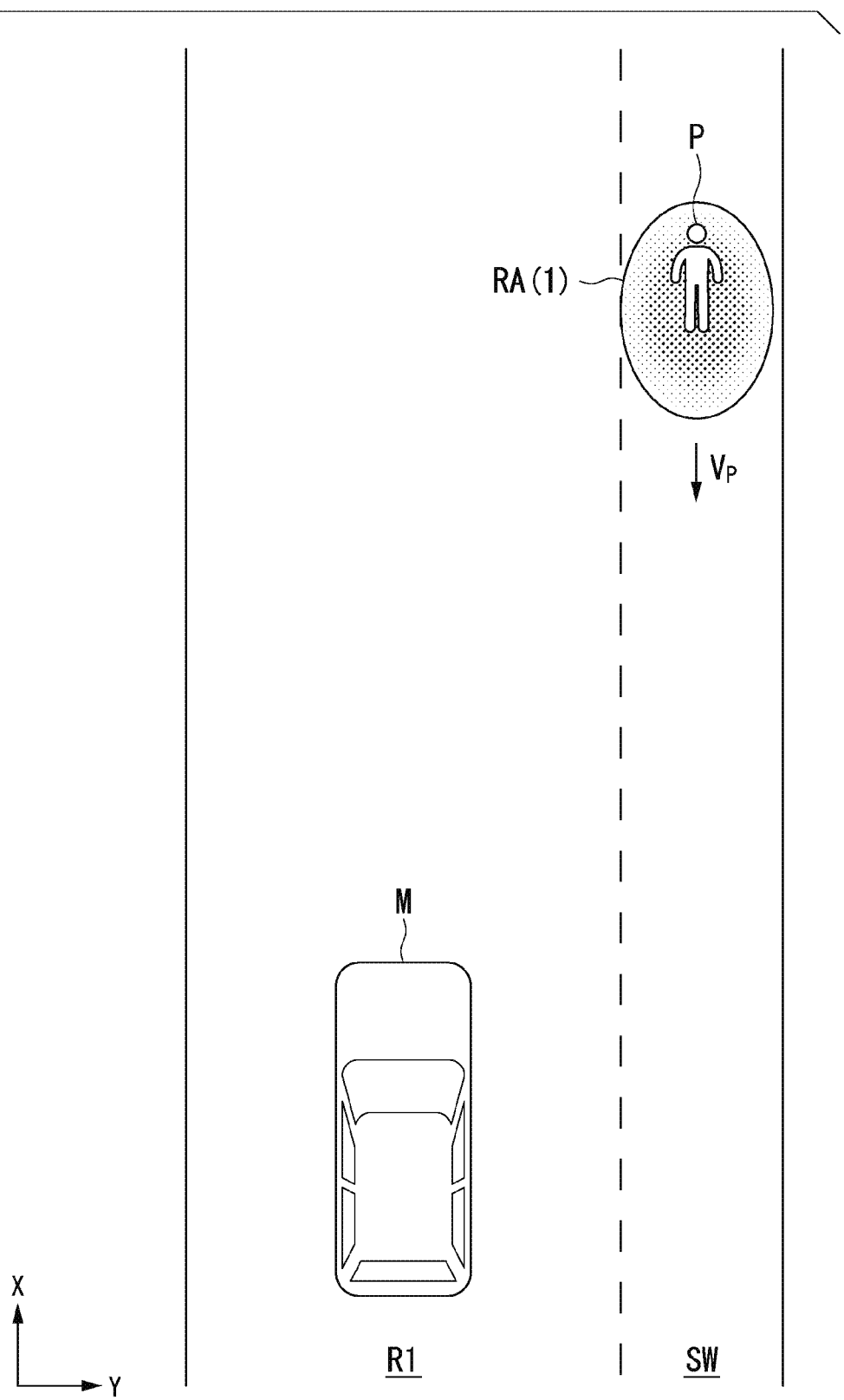
FIG. 5 is a diagram which describes a first example of a risk area.

FIG. 5 is a diagram which describes a first example of the risk area RA. The risk area setting unit 142 sets a risk area RA(1) on the basis of an estimation result of the attribute and the peripheral attention ability of the traffic participant P performed by the estimation unit 134.

The risk area setting unit 142 derives, for example, an index R (risk) that is a negative value as the traffic participant P is approached for each of a plurality of candidate points (points) on a traveling direction side of the host vehicle M, and associates the index R with each of the plurality of candidate points. "Associating" refers to, for example, storage in a memory as information corresponding to each other. For example, an outer edge line of an ellipse, which is a boundary line between a position at which the index R is zero and a position at which the index is not zero, is the risk area RA(1) shown in FIG. 5.

For example, when it is estimated by the estimation unit 134 that the traffic participant P has the peripheral attention ability (the peripheral attention ability is not reduced), the risk area setting unit 142 sets the risk area RA(1) of a normal size.

Figure 6:
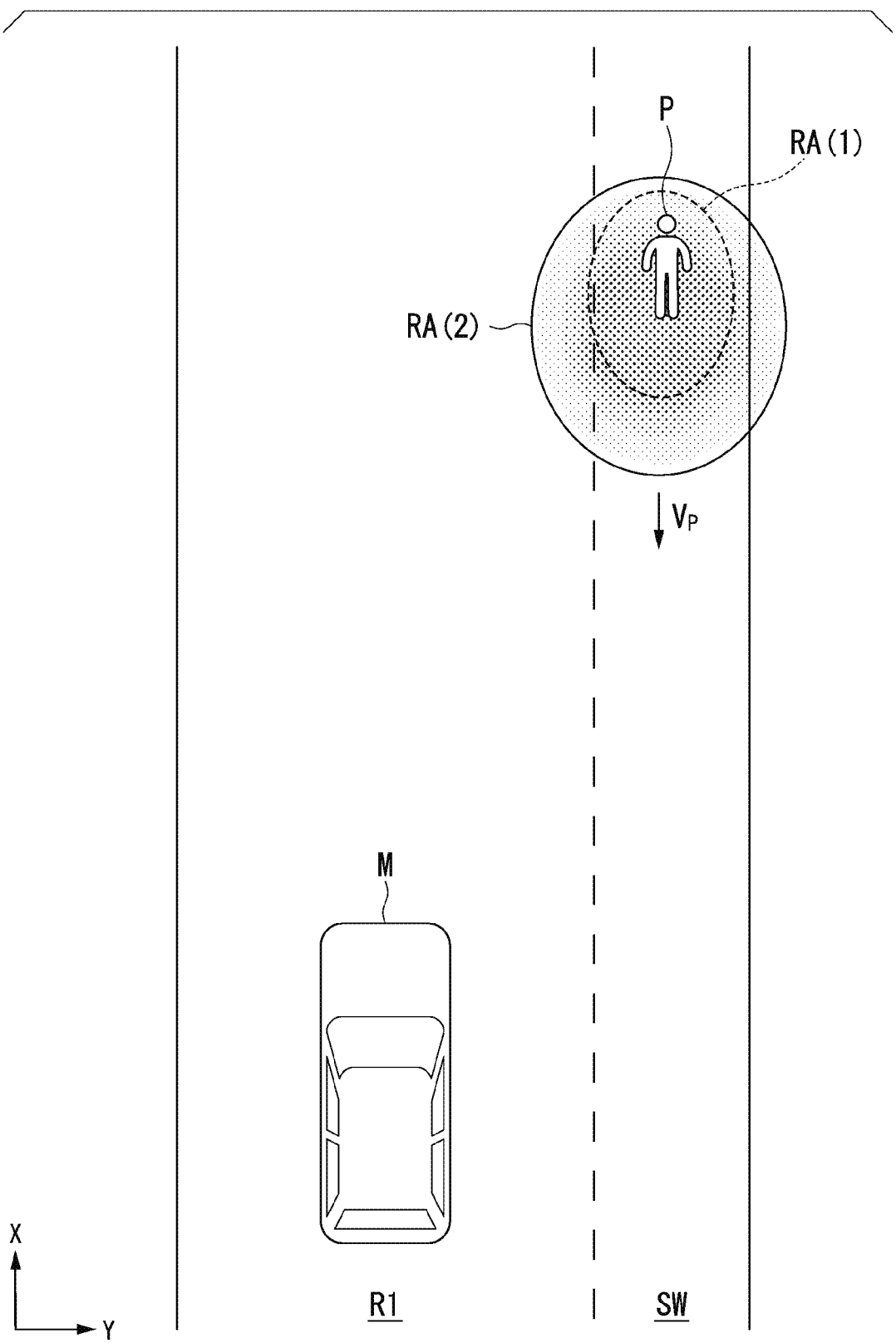
FIG. 6 is a diagram which describes a second example of the risk area.

FIG. 6 is a diagram which describes a second example of the risk area RA. When it is estimated by the estimation unit 134 that the peripheral attention ability of the traffic participant P is reduced, or when it is estimated that the attribute of the traffic participant P is an attribute with a low peripheral attention ability, the risk area setting unit 142 sets the risk area RA to be larger than when it is estimated that the traffic participant P has the peripheral attention ability.

For example, the estimation unit 134 estimates that the peripheral attention ability of the traffic participant P is reduced when it is determined that the traffic participant P is gazing at a mobile terminal. As a result, the risk area setting unit 142 sets the risk area RA to be larger than when it is estimated that the traffic participant P has the peripheral attention ability (for example, a risk area RA(2) of a large size is set as shown in FIG. 6).

Even when it is determined that the traffic participant P has the predetermined attribute by the estimation unit 134, the risk area RA may be set to be larger than when it is estimated that the traffic participant P does not have the predetermined attribute. The risk area setting unit 142 may also set the risk area RA set for the traffic participant P who is determined not to have the predetermined attribute to be larger than the risk area RA set when the traffic participant P is determined to have the predetermined attribute.

[Modified Example of Risk Area]

Figure 7:
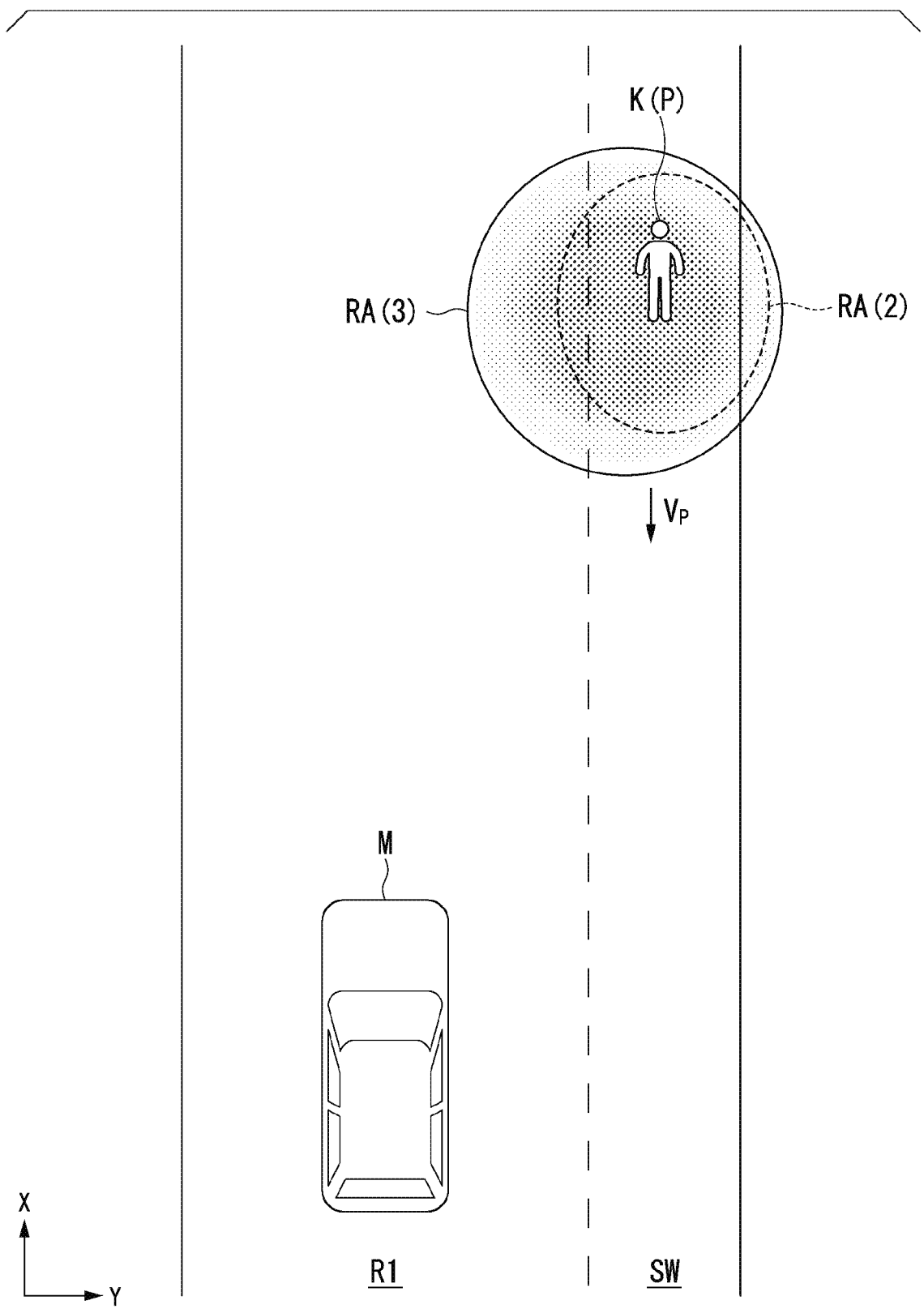
FIG. 7 is a diagram which describes a modified example of the risk area.

The risk area setting unit 142 may set a size of the risk area RA in multiple stages according to a result of the estimation performed by the estimation unit 134. FIG. 7 is a diagram which describes a modified example of the risk area RA. The risk area setting unit 142 may set the risk area RA to be much larger (for example, a risk area RA(3) of a special large size may be set) when it is estimated that the peripheral attention ability of the traffic participant P is reduced and the estimation unit 134 determines that the traffic participant P has the predetermined attributes in which the peripheral attention ability is low (for example, when a child is gazing at a mobile terminal).

[Processing Flow]

Figure 8:
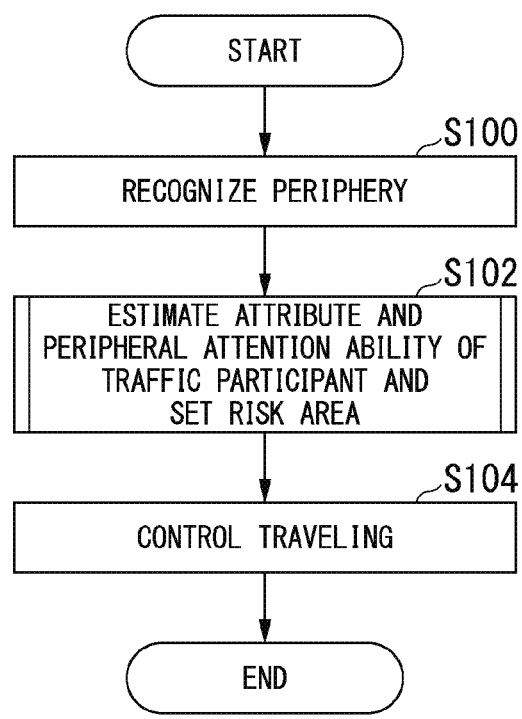
FIG. 8 is a flowchart which shows an example of vehicle control processing performed by an automated driving control device.

FIG. 8 is a flowchart which shows an example of a flow of vehicle control processing performed by the automated driving control device 100.

First, the peripheral recognition unit 132 recognizes the peripheral status of the host vehicle M (step S100). Next, the risk area setting unit 142 sets the risk area RA for the traffic participant P on the basis of an estimation result of the attribute and the peripheral attention ability of the traffic participant P performed by the estimation unit 134 (step S102). Processing details of step S102 will be described below using FIG. 9.

Next, the second control unit 160 controls at least one of the speed and steering of the host vehicle M on the basis of a traveling trajectory of the host vehicle M, which is generated on the basis of the traveling trajectory of the host vehicle M generated by the trajectory generation unit 144 on the basis of the risk area RA (step S104). As described above, description of the processing of this flowchart ends.

Figure 9:
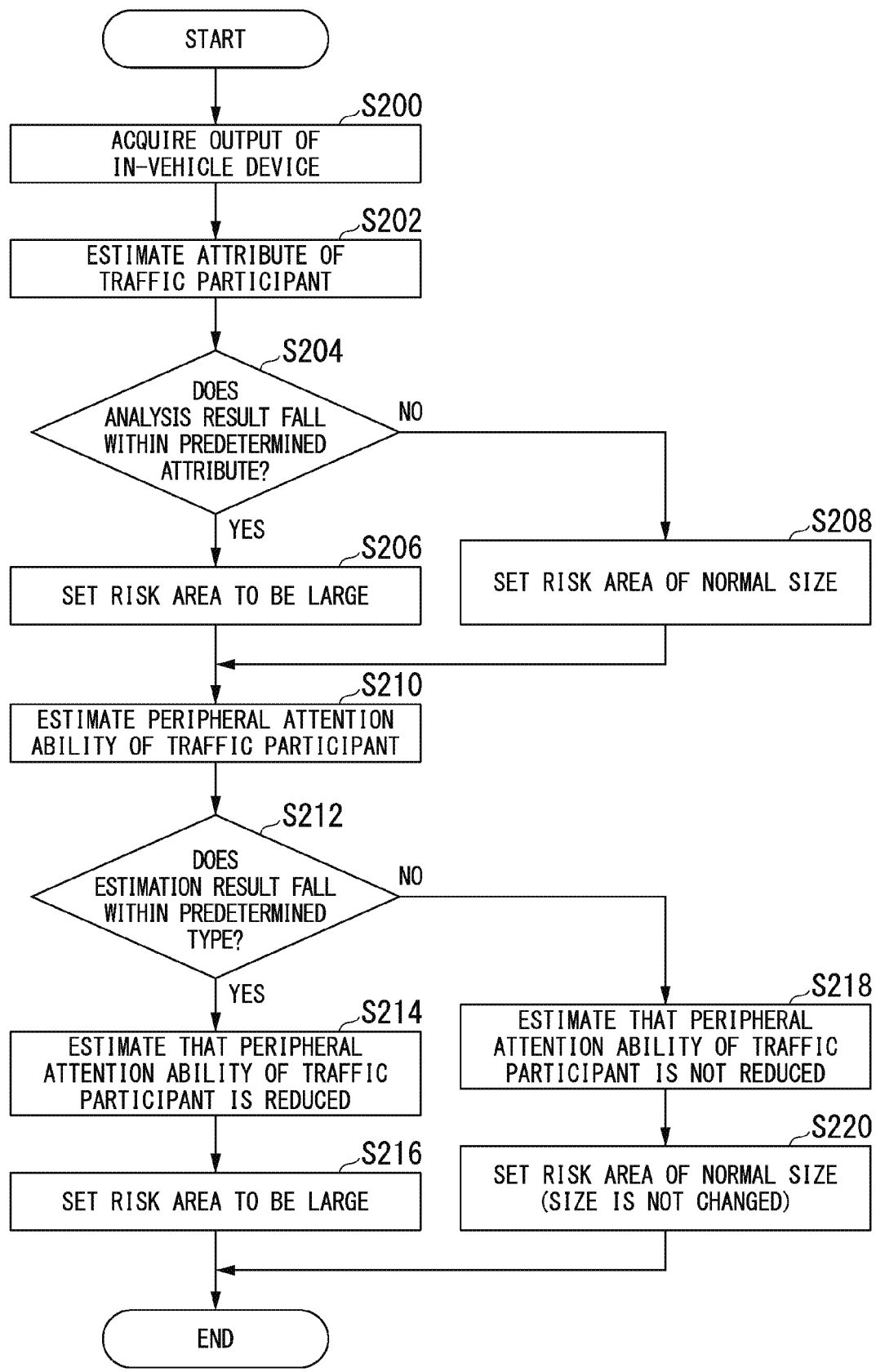
FIG. 9 is a flowchart which shows an example of a flow of estimation processing and risk area setting processing for traffic participants performed by a first control unit.

FIG. 9 is a flowchart which shows an example of a flow of the estimation processing and the risk area setting processing for the traffic participant P performed by the first control unit 120.

First, the estimation unit 134 directly (or indirectly by acquiring a result of recognition performed by the peripheral recognition unit 132) acquires an output of an in-vehicle device such as the camera 10 (step S200). Next, the estimation unit 134 estimates the attribute of the traffic participant P recognized by the peripheral recognition unit 132 (step S202).

Next, the estimation unit 134 determines whether an analysis result of step S204 falls within the predetermined attributes (step S204). When it is determined that the analysis result falls within the predetermined attributes by the estimation unit 134, the risk area setting unit 142 sets the risk area RA of the traffic participant P to be large (step S206). When it is not determined that the analysis result falls within the predetermined attributes by the estimation unit 134, the risk area setting unit 142 sets the risk area RA of a normal size for the traffic participant P (step S208).

After the processing of step S206 or step S208, the estimation unit 134 estimates the peripheral attention ability of the traffic participant P (step S210). Next, the estimation unit 134 determines whether an estimation result of step S210 falls within the predetermined types which indicate a reduction in peripheral attention ability (whether the peripheral attention ability is reduced) (step S212). When it is determined that the estimation result falls within the predetermined types, the estimation unit 134 estimates that the peripheral attention ability of the traffic participant P is reduced (step S214). Next, the risk area setting unit 142 sets the risk area RA of the traffic participant P to be large (step S216), and the processing of this flowchart ends.

On the other hand, in step S212, when it is not determined that the estimation result falls within the predetermined types, the estimation unit 134 estimates that the peripheral attention ability of the traffic participant P is not reduced (step S218). Next, the risk area setting unit 142 sets the risk area RA of a normal size for the traffic participant P (step S220), and the processing of this flowchart ends.

In the flowchart shown in FIG. 9, when the processing of step S206 is performed, processing after step S210 may be omitted, and in this case, the risk area RA of a large size is set as the risk area RA of the traffic participant P even when it is estimated in step S212 that the peripheral attention ability of the traffic participant P is not reduced. When the processing of step S216 is performed after the processing of step S206, the risk area RA of a large size may be set, and the risk area RA of a special large size, which is much larger than the large size, may also be set as the risk area RA of the traffic participant P.

[Hardware Configuration]

Figure 10:
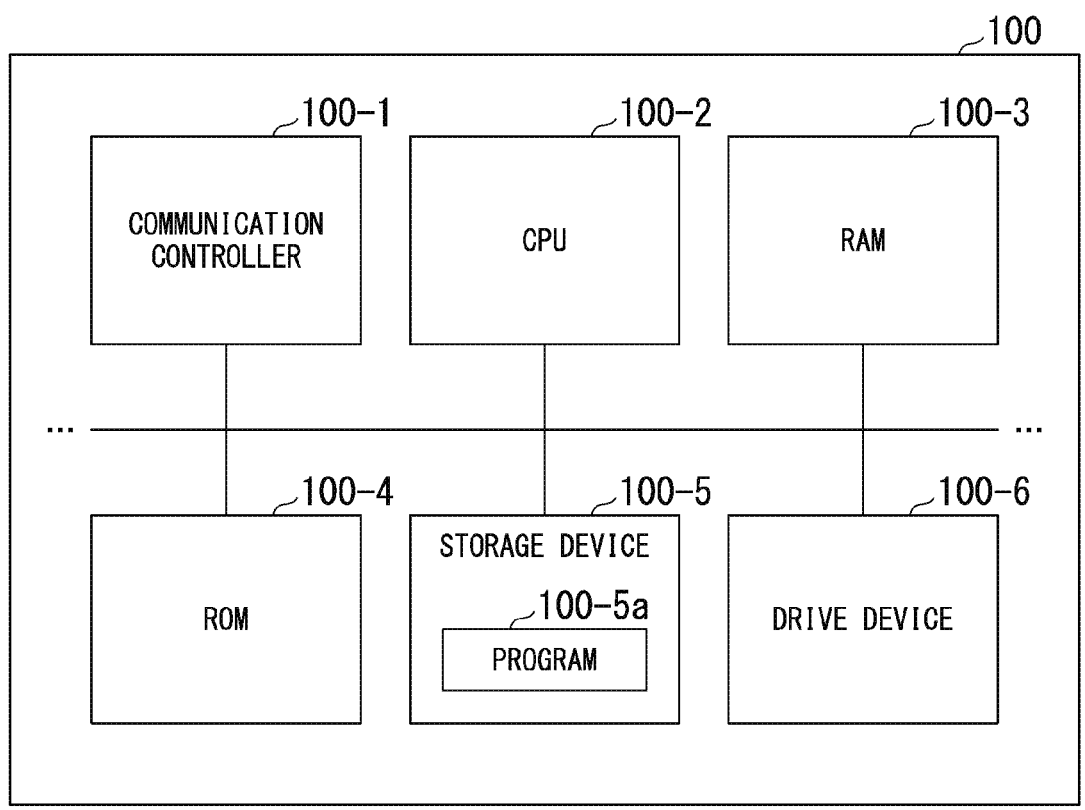
FIG. 10 is a diagram which shows an example of a flow of a hardware configuration of an automated driving control device.

FIG. 10 is a diagram which shows an example of a hardware configuration of the automated driving control device 100 of the embodiment. As shown in FIG. 10, various types of control devices are configured by a communication controller 100-1, a CPU 100-2, a RAM 100-3 used as a working memory, a ROM 100-4 for storing a booting program, a storage device 100-5 such as a flash memory or an HDD, a drive device 100-6, and the like being connected to each other by an internal bus or a dedicated communication line. The communication controller 100-1 communicates with components other than the automated driving control device 100. The storage device 100-5 stores a program 100-5*a* executed by the CPU 100-2. This program is expanded in the RAM 100-3 by a direct memory access (DMA) controller (not shown) or the like, and executed by the CPU 100-2. As a result, a part or all of the first control unit 120 and the second control unit 160 of the automated driving control device 100 are realized.

According to the embodiment described above, the estimation unit 134 estimates the attribute and the peripheral attention ability of the traffic participant P recognized by the peripheral recognition unit 132, the risk area setting unit 142 sets the risk area RA on the basis of a result of the estimation performed by the estimation unit 134, and the trajectory generation unit 144 generates a traveling trajectory on the basis of the risk area RA set by the risk area setting unit 142, and thereby the validity of risk calculation regarding the traffic participant P can be enhanced.

The embodiments described above can be expressed as follows.

The vehicle control device is configured to include a storage device that stores a program, and a hardware processor, in which the hardware processor executes a program stored in the storage device, and thereby recognizes a peripheral status of a vehicle, estimates attributes of a traffic participant positioned in a periphery of the vehicle and a peripheral attention ability of the traffic participant, sets a risk area of the traffic participant on the basis of a result of the estimation, and controls at least one of speed and steering of the vehicle on the basis of the risk area.

A mode for implementing the present invention has been described using the embodiment. However, the present invention is not limited to such an embodiment, and various modifications and substitutions may be made within a range not departing from the gist of the present invention.

What is claimed is:

1. A vehicle control device comprising:
a processor configured to:
recognize a peripheral status of a vehicle including a position of a traffic participant present in a periphery of the vehicle on a basis of an image captured by a camera provided with the vehicle;
estimate a peripheral attention ability of the traffic participant on a basis of the output of the in-vehicle device;
set a risk area associated with the traffic participant on a basis of the peripheral attention ability of the traffic participant, wherein the risk area is determined based on a defined boundary line between a first position at which an index value is zero and a second position at which the index value is not zero, and wherein the index value is a negative value as the traffic participant is being approached by the vehicle, wherein, when a plurality of time-series images of the traffic participant captured by the camera is input, the processor is configured to estimate a peripheral attention ability of the traffic participant by inputting the plurality of time-series images captured by the camera to a learning model that is trained to output information indicating whether the traffic participant is in a state where the peripheral attention ability is reduced; and
based on the risk area associated with the traffic participant and the state where the peripheral attention ability of the traffic participant is reduced, facilitating steering of the vehicle to avoid entry by the vehicle into the risk area.

2. The vehicle control device according to claim 1,
wherein, when it is estimated that the peripheral attention ability of the traffic participant is reduced, the processor is configured to set a risk area of the traffic participant to be larger than when it is not estimated that the peripheral attention ability of the traffic participant is reduced.

3. The vehicle control device according to claim 2,
wherein the processor is further configured to determine whether a person who is the traffic participant is gazing at a mobile terminal, and estimate that the peripheral attention ability of the traffic participant is reduced when the traffic participant is gazing at the mobile terminal.

4. The vehicle control device according to claim 2,
wherein the processor is further configured to determine whether a person who is the traffic participant is in a drunken state, and estimate that the peripheral attention ability of the traffic participant is reduced when the traffic participant is in the drunken state.

5. The vehicle control device according to claim 2,
wherein the processor is further configured to determine whether the ears of a person who is the traffic participant are blocked, and estimate that the peripheral attention ability of the traffic participant is reduced when the ears of the traffic participant are blocked.

6. The vehicle control device according to claim 2,
wherein the processor is further configured to determine whether a field of view of a person who is the traffic participant is blocked, and estimate that the peripheral attention ability of the traffic participant is reduced when the field of view of the traffic participant is blocked.

7. A vehicle control method comprising:
by a computer comprising a processor,
based on receiving, by the computer, output data from an image captured by a camera provided with a vehicle, recognizing a peripheral status of the vehicle including a position of a traffic participant present in a periphery of the vehicle;
based on the output data from the in-vehicle device, estimating, by the computer, a peripheral attention ability of the traffic participant;
based on the peripheral attention ability of the traffic participant, setting, by the computer, a risk area associated with the traffic participant, wherein the risk area is determined based on a defined boundary line between a first position at which an index value is zero and a second position at which the index value is not zero, and wherein the index value is a negative value as the traffic participant is being approached by the vehicle, wherein, when a plurality of time-series images of the traffic participant captured by the camera is input, the processor is configured to estimate a peripheral attention ability of the traffic participant by inputting the plurality of time-series images captured by the camera to a learning model that is trained to output information indicating whether the traffic participant is in a state where the peripheral attention ability is reduced; and
based on the risk area associated with the traffic participant and the state where the peripheral attention ability of the traffic participant is reduced, facilitating steering of the vehicle to avoid entry by the vehicle into the risk area.

8. A computer-readable non-transitory storage medium that stores a program causing a computer to execute
based on receiving output data from an image captured by a camera provided with a vehicle, recognizing a peripheral status of the vehicle including a position of a traffic participant present in a periphery of the vehicle;
based on the output data from the in-vehicle device, estimating a peripheral attention ability of the traffic participant;
based on the peripheral attention ability of the traffic participant, setting a risk area associated with the traffic participant, wherein the risk area is determined based on a defined boundary line between a first position at which an index value is zero and a second position at which the index value is not zero, and wherein the index value is a negative value as the traffic participant is being approached by the vehicle, wherein, when a plurality of time-series images of the traffic participant captured by the camera is input, the processor is configured to estimate a peripheral attention ability of the traffic participant by inputting the plurality of time-series images captured by the camera to a learning model that is trained to output information indicating whether the traffic participant is in a state where the peripheral attention ability is reduced; and
based on the risk area associated with the traffic participant and the state where the peripheral attention ability of the traffic participant is reduced, facilitating steering of the vehicle to avoid entry by the vehicle into the risk area.

9. The vehicle control device according to claim 1,
wherein the processor is further configured to:
control at least one of speed and steering of the vehicle on a basis of the risk area.

* * * * *